United States Patent Office 3,156,528
Patented Nov. 10, 1964

3,156,528
PROCESS FOR RECOVERING AN ALKALI METAL PEROXIDE OCTAHYDRATE
John R. Moyer, Charles K. Bon, and Dale L. Schechter, Midland, Mich., assignors to The Dow Chemical Company, Midland, Mich., a corporation of Delaware
No Drawing. Filed Sept. 10, 1962, Ser. No. 222,643
4 Claims. (Cl. 23—184)

This invention relates to the recovery of certain alkali metal peroxides, and more specifically is concerned with a process for recovering the peroxides of sodium and lithium from respective aqueous solutions thereof.

It is the principal object of the present invention to provide an economical and simple process for recovering sodium or lithium peroxides from aqueous solutions thereof. A related object is to provide such a process whereby substantially high recovery yields of the peroxide are obtained.

These and other objects and advantages will become apparent from the detailed description presented hereinafter.

In accordance with the present process, an aqueous solution of the sodium or lithium peroxide sought to be recovered therefrom, in concentrations limited only by its solubility factor under the ambient conditions, is enriched by various means with sufficient corresponding alkali metal hydroxide, to provide a concentration of said hydroxide from about 3 to about 25 weight percent, such that the solution is saturated with respect to the peroxide, thereby precipitating the excess peroxide from solution either as sodium peroxide octahydrate or as lithium peroxide monohydrate, accordingly. The solubility of the alkali metal peroxide in the presence of a hydroxide concentration within the aforementioned range is substantially reduced and becomes virtually negligible as a hydroxide concentration of about 25 percent by weight is reached. The temperature of the solution containing the peroxide and its corresponding hydroxide is to be within the range of about $-20°$ to about $40°$ C.

In order to extract the alkali metal peroxide from solution under the method of this invention, by reducing its solubility through the effect of its corresponding alkali metal hydroxide, various means of enriching or increasing the peroxide solution with the hydroxide precipitant can be employed. Such means include (1) adding the alkali metal hydroxide, either dry or in aqueous solution, to the peroxide solution; or (2) adding a compound of the alkali metal which hydrolyzes to produce a solution of the alkali metal hydroxide; or (3) evaporating the aqueous peroxide solution containing some hydroxide in a continuous or batchwise operation, thereby increasing the hydroxide concentration and lowering the saturation point of the peroxide. Alternatively, an aqueous solution of an alkali metal hydroxide can be employed as a reaction medium or as a leachant for a reaction medium in which the coresponding alkali metal peroxide is produced. In such as case a nearly saturated solution of the alkali metal peroxide is produced and by cooling, a substantial portion of the alkali metal peroxide is precipitated.

In attempting to extend the process to recover the peroxides of potassium, cesium, and rubidium, it was found that no insoluble hydrates of these peroxides were formed in the presence of the alkali metal hydroxides used.

The method of this invention can be carried out in a batch-type or a continuous-type operation, and can be modified in various ways without departing from the substance and spirit of the invention, but it is understood that we limit ourselves only as defined in the appended claims.

The following examples are given to further illustrate the present invention, but are not intended to be construed as limiting the invention thereto.

*Example I*

A solution containing about 2.54 grams $Na_2O_2$, 2.34 grams NaOH, and 100 grams of water was enriched with NaOH by adding 100 grams of 50 percent by weight solution thereof, thereby providing a hydroxide concentration in the final mixture of about 25 percent by weight. About 8.3 grams of the octahydrate peroxide were recovered assaying about 29.9 percent $Na_2O_2$ and representing approximately 97 percent of the original $Na_2O_2$ in solution.

*Example II*

Oxidized sodium amalgam from a mercury cathode chlorine cell is leached with a solution of approximately 10 percent NaOH in water, removing the oxides of sodium from the mercury, the monoxide hydrolyzing to form NaOH thereby increasing the hydroxide concentration slightly. The effluent leach solution, with sludge removed, is then passed through a heat exchanger where it is cooled to about $6°$ C. and where crystals of $$Na_2O_2 \cdot 8H_2O$$

appear. The crystals are removed by centrifuging, and the filtrate is then warmed to the ambient temperature and recycled through the system. To maintain a constant NaOH concentration of about 10 percent, a small side stream of filtrate is withdrawn and replaced with water. Yields are calculated by recording the $Na_2O_2$ recovered as crystals compared to the $Na_2O_2$ left in the filtrate. Yields of $Na_2O_2$ recovered by this method were recorded within the range from about 80 to about 96 percent by weight.

The invention can be further illustrated by application to a continuous process whereby $Na_2O_2$ is fractionally crystallized through evaporation by heating the peroxide solution containing some corresponding hydroxide. The peroxide solution used here can be of the same type as used in Example II, namely, the leach solution containing $Na_2O_2$ and NaOH. The solution is then sprayed into the top of an evaporator which is under a low pressure, and upon evaporation is cooled, and the hydroxide concentration increased precipitating the octahydrate crystals from the $Na_2O_2$ saturated solution. The crystals are collected and the cooled solution recycled along with fresh solution added to restore the volume lost by evaporation. The process is continued and the $$Na_2O_2 \cdot 8H_2O$$

recovered in substantial yields.

We claim:

1. A method for recovering an alkali metal peroxide selected from the group consisting of sodium peroxide and lithium peroxide from an aqueous solution of said peroxide which comprises, adding to said aqueous solution an approximately equal volume of about 50 percent by weight solution of the corresponding alkali metal hydroxide, exposing the resulting mixture to a temperature in the range of from about $0°$ C. to about $20°$ C., thereby to precipitate correspondingly a solid hydrate selected from the group consisting of sodium peroxide octahydrate and lithium peroxide monohydrate, and separating the hydrate so-precipitated from the solution.

2. The method which comprises leaching oxidized sodium amalgam at a temperature above $10°$ C. with an aqueous solution of about 10 percent by weight sodium hydroxide as a leachant to remove sodium oxides therefrom, cooling the resulting solution to a temperature within the range from about $2°$ C. to about $10°$ C., thereby producing a saturated solution of sodium peroxide and a precipitate of sodium peroxide octahydrate, separating the so-precipitated octahydrate from said solution, warming said saturated solution to a temperature above 10° C. and restoring thereto the original hydroxide concentration by replacing a predetermined portion of the warmed filtrate with water, recycling said peroxide solution to extract additional peroxide from the oxidized amalgam, and continuing the process to recover a total substantially quantitative yield of the sodium peroxide octahydrate.

3. The method of claim 2 wherein the oxidized amalgam is initially leached with water and the process continued until the hydroxide reaches a concentration of about 10 percent by weight, thereafter maintaining said concentration by replacing a portion of the filtrate with water as needed.

4. A method for recovering an alkali metal peroxide selected from the group consisting of sodium peroxide and lithium peroxide from an aqueous solution of said peroxide which comprises, reducing the solubility of the alkali metal peroxide in said aqueous peroxide solution by providing therein a concentration of the corresponding alkali metal hydroxide from about 3 to about 25 percent by weight, exposing the solution containing the peroxide and its corresponding hydroxide to a temperature in the range of from about 0° C. to about 20° C., thereby to precipitate correspondingly a solid hydrate selected from the group consisting of sodium peroxide octahydrate and lithium peroxide monohydrate, and separating the hydrate so-precipitated from the solution.

References Cited in the file of this patent

UNITED STATES PATENTS 2,488,485    Winternitz _____ Nov. 15, 1949

FOREIGN PATENTS 3,820    Great Britain _____ 1905

OTHER REFERENCES

J. W. Mellor's "A Comprehensive Treatise on Inorganic and Theoretical Chemistry," vol. 2, 1922 ed., page 489. Longmans, Green & Co., N.Y., publishers.